(12) United States Patent
Gros et al.

(10) Patent No.: US 12,522,322 B1
(45) Date of Patent: Jan. 13, 2026

(54) SIDE WINDOW FOR MOTOR AREA OF A VESSEL

(71) Applicant: Highway Products, Inc., White City, OR (US)

(72) Inventors: Eugene Washington Gros, Eagle Point, OR (US); Charles P. Gros, Eagle Point, OR (US)

( * ) Notice: Subject to any disclaimer, the term of this patent is extended or adjusted under 35 U.S.C. 154(b) by 407 days.

(21) Appl. No.: 18/214,679

(22) Filed: Jun. 27, 2023

Related U.S. Application Data

(60) Provisional application No. 63/393,715, filed on Jul. 29, 2022.

(51) Int. Cl.
*B63B 19/02* (2006.01)

(52) U.S. Cl.
CPC .................................. *B63B 19/02* (2013.01)

(58) Field of Classification Search
CPC ......... B63B 19/00; B63B 19/02; B63B 19/04; B63B 19/06; B63B 19/08; B63B 19/12; B63B 19/14
USPC .... 114/173, 176, 178, 201 R, 203, 343, 361, 114/382; 296/146.15, 146.16; 454/95
See application file for complete search history.

(56) References Cited

U.S. PATENT DOCUMENTS

| | | | | |
|---|---|---|---|---|
| 5,695,273 | A * | 12/1997 | Lanning | F21V 21/0808 362/249.11 |
| 5,848,575 | A * | 12/1998 | Freeman | E05C 9/00 292/50 |
| 7,688,013 | B2 * | 3/2010 | Frommer | E05F 15/73 318/266 |
| 8,678,483 | B2 * | 3/2014 | Quirk | B60J 1/00 296/193.11 |
| 9,676,467 | B2 * | 6/2017 | Terazawa | B63B 27/146 |

FOREIGN PATENT DOCUMENTS

| | | |
|---|---|---|
| CN | 205872371 | 1/2017 |
| CN | 210027802 | 2/2020 |
| CN | 110979558 | 4/2020 |
| DE | 2430223 | 1/1976 |
| DE | 4038415 | 6/1992 |
| DE | 19601014 | 7/1996 |
| DE | 102017120138 | 3/2019 |
| GB | 1059555 | 2/1967 |
| KR | 20110054374 | 5/2011 |
| WO | WO2014183615 | 11/2014 |

* cited by examiner

*Primary Examiner* — Daniel V Venne
(74) *Attorney, Agent, or Firm* — Jerry Haynes Law

(57) ABSTRACT

A side window for motor area of a vessel of the present invention comprises a transparent glass pane having an exterior side and an interior side; wherein a frame secures the glass pane. Further the window is fitted with one or more light sources that are configured to mount to the interior side of the window. One or more screws are used to detachably attach the window to the area where motor and other related equipments of a vessel can be viewed and accessed for maintenance and periodic checking. Further a power source with a control switch is attached to control the light sources to illuminate the motor area of the vessel. The window facilitates easy and quick access and viewing the motor area of the vessel while improvising safety and ornamentation of the vessel.

6 Claims, 4 Drawing Sheets

SIDE WINDOW FOR MOTOR AREA OF A VESSEL

CROSS-REFERENCE TO RELATED APPLICATIONS

This application claims priority from U.S. Provisional Application Ser. No. 63/393,715, entitled "Side Window for Motor Area of a Vessel", filed on Jul. 29, 2022, which application is hereby incorporated herein by reference in its entirety.

FIELD OF THE INVENTION

The present invention relates generally to a window for a vessel. Moreover, the present invention relates to a side window for the motor area of a vessel.

BACKGROUND OF THE INVENTION

The following background information may present examples of specific aspects of the prior art (e.g., without limitation, approaches, facts, or common wisdom) that, while expected to be helpful to provide additional aspects of the prior art, is not to be construed as limiting the present invention, or any embodiments thereof, to anything stated or implied therein or inferred thereupon.

Generally, to access a motor area or a bilge area of a vessel such as a ship, boat or any type of watercraft, the side panel of the vessel must be removed, which is a time consuming and a difficult task. Regular or quick checking or monitoring of the motor area is not possible with the existing vessel designs that are available, thus there is a need to provide an arrangement that is easy to assemble and disassemble, further, without disassembly, the arrangement also provide quick monitoring of the motor area or the bilge area of the water vessel.

Although in many of the prior arts have achieved varying degrees of success, the vessels in prior art particularly the sub-marine vessels are provided with transparent covers/windows for the motor/bilge area, but they are very complex in design and expensive as well, as these arrangements are made in watertight configuration.

Numerous attempts have been made and several prior art devices are known that may be suitable for the specific purposes to which they address, however, they would not be as suitable for the purposes of the present invention.

For example, PCT published patent application WO2014183615A1 5845952 to Xiaobin et al. discloses a fastening structure and fastening method for the transparent part of an observation window on a manned submersible.

Korean Patent Application No. KR20110054374A to Kim Jin Ki et al. describes a clear-view screen for a ship to secure a field of view during sailing in the rain by rotating a window to remove water from the window. A light transmissive window is provided in the opening of the window frame.

Pat. No. GB1059555A to William, teaches a clear view screen attachable to a window panel of a vessel with hot air circulation arrangement.

Pat. No. DE2430223B2 to Rötgen et al., teaches a rotating transparent window, especially for ships, in which in a permanently installed pane of glass a motor is arranged, on the motor shaft of which the rotating glass pane sits, and wherein means for heating the space between the permanently installed glass pane and the rotating one Glass pane are provided.

Pat. Application No. DE19601014A1 to Mauno et al. discloses a Transparent plastics window for motor vehicles or boat soft top or tent.

Pat. Application No. DE102017120138B4 to Florian discloses a transparent panel provided with a camera that facilitate observing an area, as well as useful for machine monitoring of the area. In particular.

Pat. Application No. CN210027802U to Guangqi et al. discloses a yacht porthole which comprises a window frame, a glass window, a functional lock catch and a sponge rubber ring. The yacht portholes are mainly arranged on two sides of the yacht and used as windows of cabins.

Pat. Application No. CN205872371U to Guan discloses a marine window provided with ring glass and small circle glass.

Pat. Application No. CN110979558A to Zhengming et al. discloses a prefabricated hatch board structure of glass steel ship, is equipped with the deck, is equipped with on the deck to be used for the prefabricated hatch board that is linked together with cabin inside.

Even though these innovations may be suitable for the specific purposes to which they address, accordingly, they would not be suitable for the purposes of the present invention as heretofore described to be used in a vessel or watercraft or the like. Thus, a window that allows quick inspection of the motor or bilge area of a vessel is needed.

SUMMARY OF THE INVENTION

Generally, the motor or bilge area of a vessel is not easily accessible in a vessel, particularly in a boat or a watercraft. Thus instead of removing the side panel pieces that normally block the sides and bottom of the motor and bilge area, it is better to cut out holes on the traditional solid (non-transparent) panel and that cut out to be fitted with a quick accessible window, which allows motor area to be easily inspected.

The present invention relates to a side window for viewing/inspecting motor area of a vessel, wherein the window comprises: a transparent glass pane, wherein the window with the glass pane has an exterior side and an interior side; a frame to secure the glass pane; one or more light sources are configured to mount to the interior side of the window; and a power source with a control switch is attached to the light sources to illuminate motor area of the vessel.

One objective of the present invention is to provide a transparent side window for a vessel.

Another objective of the present invention is to provide a window that allows quick and easy access for viewing/inspection of the motor area of a vessel.

Still another objective of the present invention is to provide a window that provides ornamentation of the vessel.

Another objective of the present invention is to provide a window that improvises safety of the vessel.

Another objective of the present invention is to provide a window that has additional enables attaching or engraving a logo to the frame of the window.

These and other advantages of the invention will be further understood and appreciated by those skilled in the art by reference to the following written specification, claims and appended drawings.

These and other objectives, advantages and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
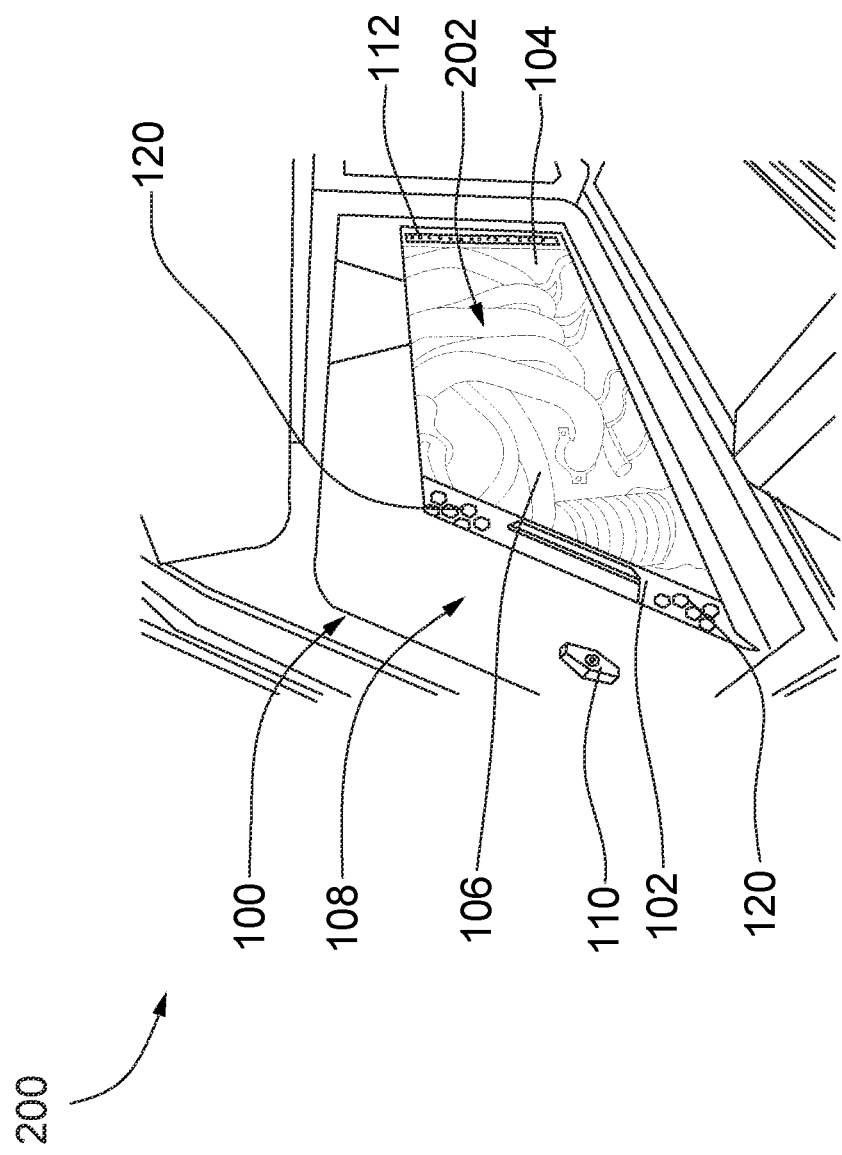
FIG. 1 illustrates a front perspective view of an exemplary side window for motor area of a vessel, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1 to FIG. 4. Furthermore, there is no intention to be bound by any expressed or implied theory presented in the preceding technical field, background, summary, or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

According to several embodiments of the present invention as shown in FIGS. 1-4, a window or an access door 100 for the area where the motor and other related equipment 202 of a vessel 200, including but not limited to boats and ships, are stored is provided by the present invention. The window 100 of the present invention comprises an exterior side 102 and an interior side 104, wherein a handle (not shown) is attached to the exterior side of the window 100. Further window 100 comprises a transparent glass pane 106 secured by a frame 108 around the periphery of the glass pane 100. Transparent glass pane 106 allows clear visibility of the motor and other related equipment 202 of the vessel 200. The interior side 104 of window 100 is configured to mount light sources 112 to provide illumination to the motor area and bilge area of the vessel 200, wherein without limitation, the lights 112 are LED lights. According to an exemplary embodiment, a plurality of LED lights are arranged in between two glass panes 106, wherein the two glass panes are secured by frame 108 of the window 100. The window is further provided with access to a power supply to the LED lights and a control switch for controlling the LED lights.

According to another exemplary embodiment, instead of the handle 120 attached to the exterior side of the window 100, the window 100 is detachably fixed to the stern area of the vessel 200 by two or more screws 110, wherein the unscrewing the screws 110 allows the window 100 to be removed for maintenance of the motor and other related equipments 202 of the vessel 200. According to another embodiment, the screws 110 are butterfly screws to facilitate easy unscrewing of the window 100.

According to another exemplary embodiment of the present invention the frame member 108 of window 100 is made of material without limitation aluminum or steel or other metal strips or fiber or plastic or wood or the like.

According to another exemplary embodiment of the present invention the window 100 is without limitation of trapezium shape, however other shape and size, window 100 of the present invention can be used as per the need without departing from the scope and spirit of the present invention.

According to an aspect of the present invention, a window 100 for motor area 202 of a vessel 200, wherein the window 100 comprises: a transparent glass pane 106 having an exterior side 102 and an interior side 104, wherein the glass pane 106 is securely attached to a frame 108; and one or more light sources 112 configured to mount to the interior side 104 of the glass pane 106, wherein a power source (not shown) with a control switch (not shown) is attached to the light sources 112 to illuminate the motor area 202 of the vessel 200.

According to another aspect of the present invention, window 100 is slidingly attached to vessel 200.

According to another aspect of the present invention, a window 100 for viewing motor area 202 of a vessel 200, wherein the window 100 comprises: a transparent glass pane 106 having an exterior side 102 and an interior side 104; a frame 108 secures the glass pane 106, wherein the frame 108 is configured to allow the window 100 to be detachably attached to a side panel of the vessel 200; one or more light sources 112 are configured to mount to the interior side 104 of the window 100; and a power source (not shown) with a control switch (not shown) is attached to the light sources 112 to illuminate motor area 202 of the vessel 200.

According to another aspect of the present invention, the light sources 112 are LED lights.

According to another aspect of the present invention, frame 108 is made of aluminum.

According to another aspect of the present invention, window 100 is detachably attached to vessel 200 by plurality of butterfly screws 110.

According to another aspect of the present invention, window 100 is of trapezium shape.

According to another aspect of the present invention, window 100 comprises two glass panes 106 that are secured by frame 106, whereby the light sources 112 are placed between the glass panes 106.

According to another aspect of the present invention, frame 106 of the window 100 further comprises plurality of holes 120 for proper ventilation to the motor area 202 of the vessel 200.

According to an embodiment of the present invention as shown in FIG. 1 illustrates a front perspective view of an exemplary side window 100 for motor area 202 of a vessel 200. The window 100 comprises a transparent glass pane 106 having an exterior side 102 and an interior side 104; wherein a frame 108 secures the glass pane 106. Further window 100 is fitted with one or more light sources 112 that are configured to mount to the interior side 104 of the window 100. One or more screws 110 are used to detachably attach the window 100 to the area where motor and other related equipments 202 of a vessel 200 can be viewed and accessed for maintenance and periodic checking. Further a power source with a control switch (not shown) is attached to control the light sources 112 to illuminate motor area 202 of the vessel 200.

Figure 2:
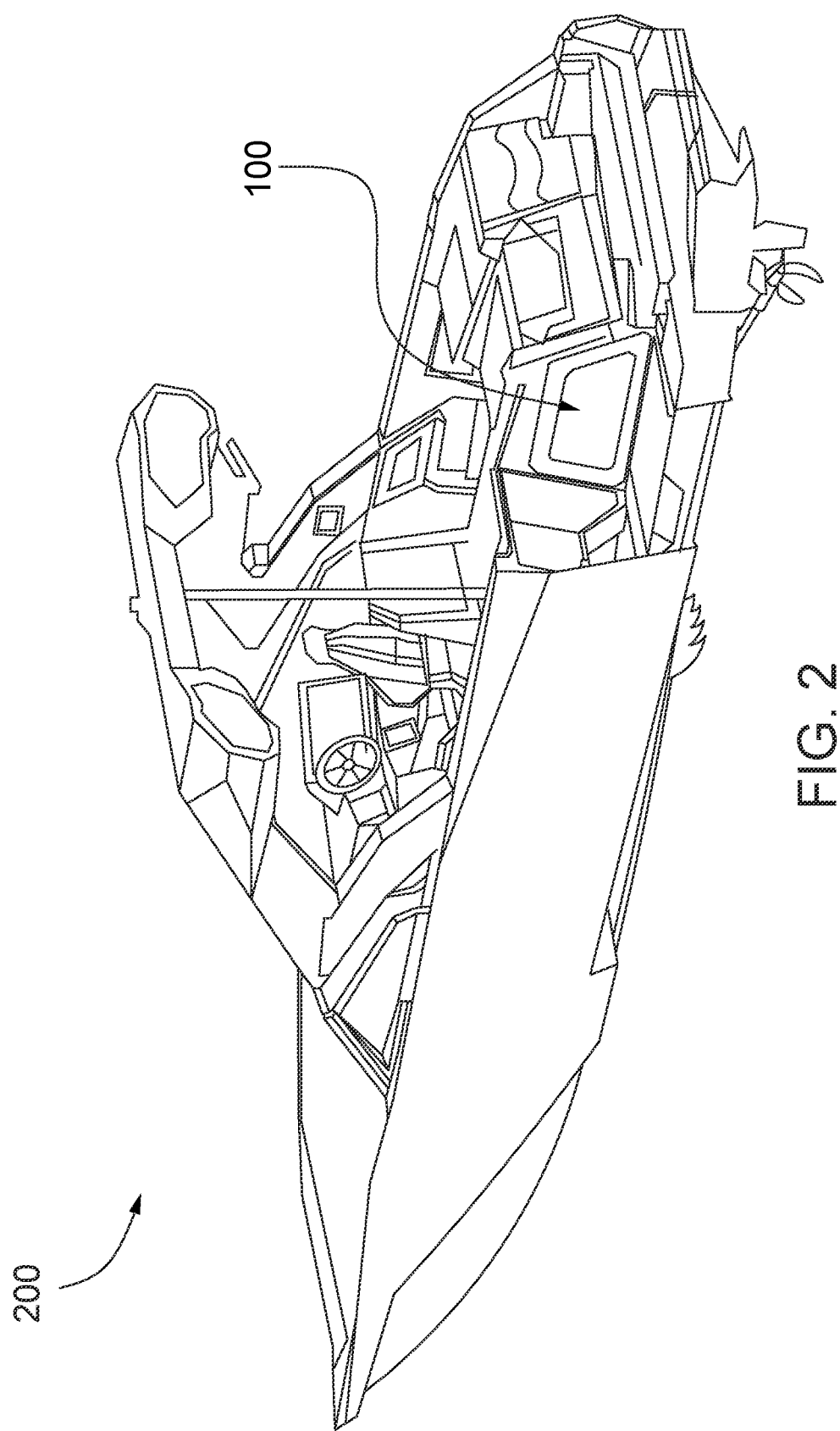
FIG. 2 illustrates a side perspective view of an exemplary vessel to which the side window for motor area is fitted, in accordance with an embodiment of the present invention.

According to another embodiment of the present invention as shown in FIG. 2 illustrates a side perspective view of an exemplary vessel 200 to which the side window 100 for motor area 202 is fitted.

Figure 3:
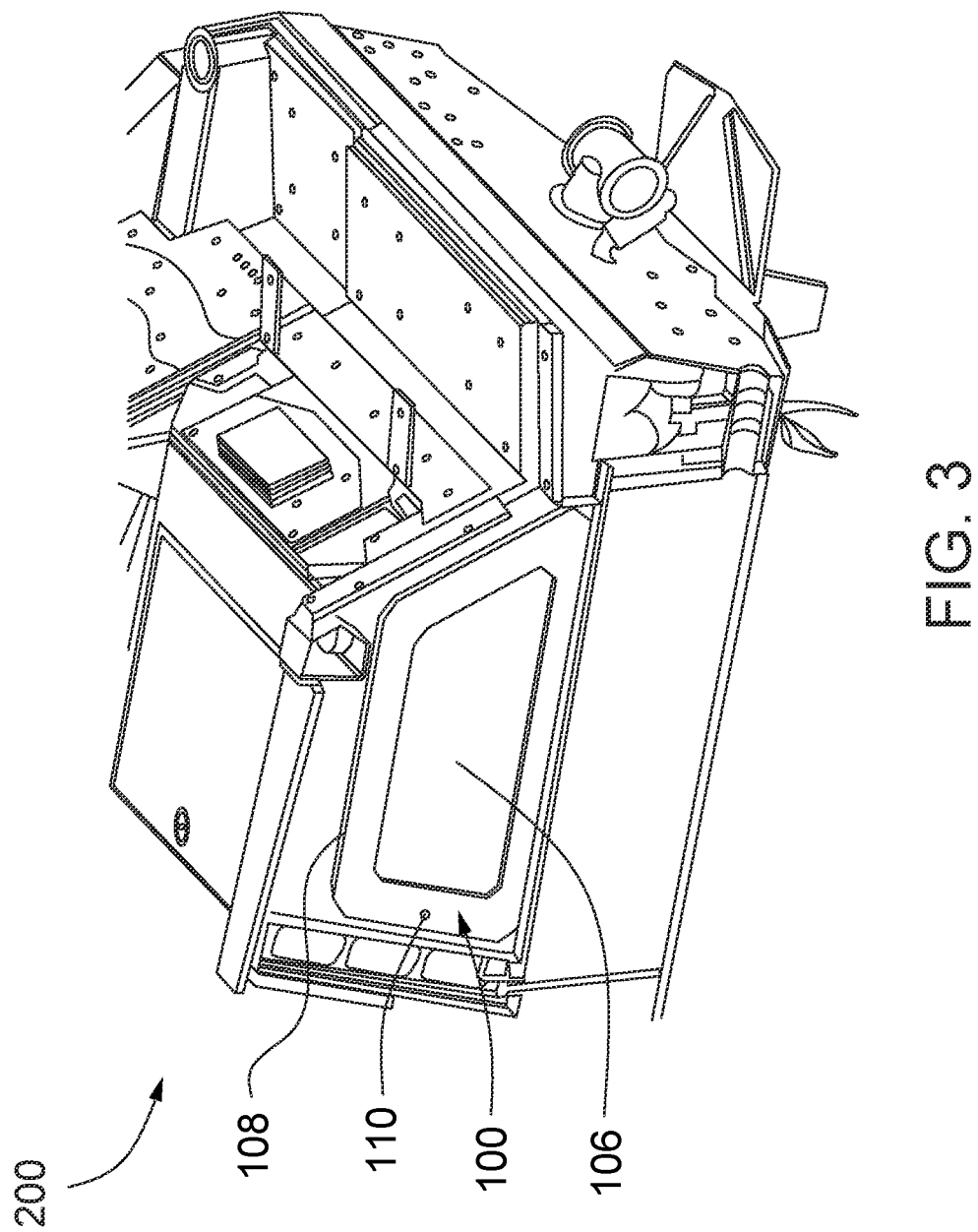
FIG. 3 illustrates a side perspective view of the exemplary window showing its detachable fitting to the vessel by using one or more screws to fasten the frame to the vessel.

According to another embodiment of the present invention as shown in FIG. 3 illustrates a side perspective view of the exemplary window 100 showing its detachable fitting to the vessel 200 by using one or more screws 110 to fasten the frame 108 to the vessel 200. The window 100 comprises a transparent portion 106 that facilitates safety, while allowing to access and view the motor area 202 of the vessel 200, further the window 100 improves ornamentation of the vessel 200.

Figure 4:
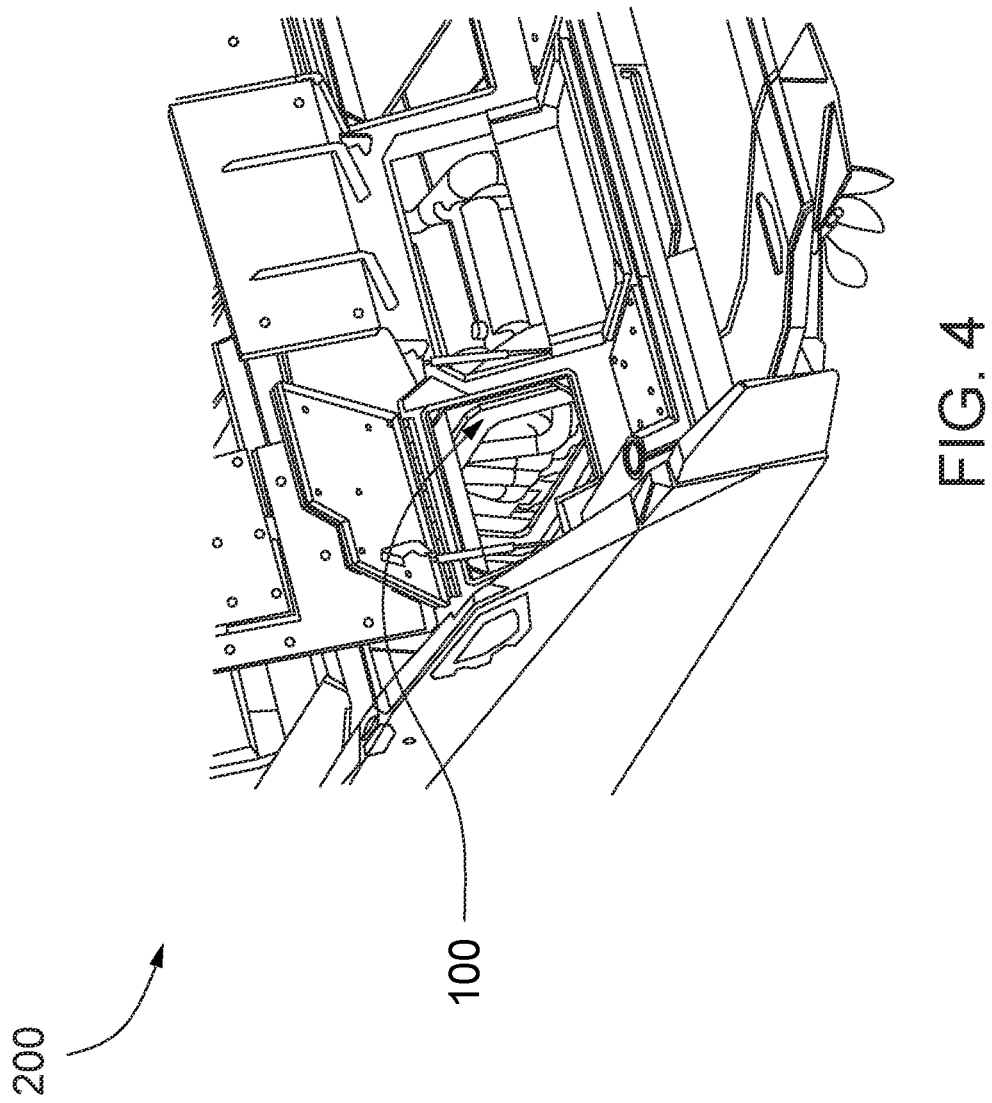
FIG. 4 illustrates a side perspective view of the exemplary window showing the side window that is accessed via opening a hatch door of the vessel thereby adding additional safety to the vessel, in accordance with an embodiment of the present invention.

According to another embodiment of the present invention as shown in FIG. 4 illustrates a side perspective view of the exemplary window 100 showing the side window 100 that is accessed via opening a hatch door of the vessel 200 thereby adding additional safety to the vessel 200. Without removing window 100, motor and its related equipments 202 can be viewed to facilitate easy and quick maintenance of vessel 200.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A window for motor area of a vessel, wherein the window comprises:
   a transparent glass pane having an exterior side and an interior side;
   a frame secures the transparent glass pane, wherein the frame is configured to allow the window to be detachably attached to a side panel of the vessel;
   one or more light sources, wherein the one or more light sources are configured to mount to the interior side of the glass pane;
   a power source with a control switch is attached to the one or more light sources to illuminate the motor area of the vessel; and
   wherein the window comprises two glass panes that are secured by the frame, whereby the one or more light sources are placed between the glass panes.

2. The window as claimed in claim 1, wherein the one or more light sources are LED lights.

3. The window as claimed in claim 1, wherein the frame is made of aluminum.

4. The window as claimed in claim 1, wherein the window is detachably attached to the vessel by plurality of butterfly screws.

5. The window as claimed in claim 1, wherein the window is of trapezium shape.

6. The window as claimed in claim 1, wherein the frame of the window further comprises plurality of holes for proper ventilation to the motor area.

* * * * *